United States Patent
Steele

(10) Patent No.: US 7,400,127 B2
(45) Date of Patent: Jul. 15, 2008

(54) METHOD FOR REGULATING AN OUTPUT SIGNAL AND CIRCUIT THEREFOR

(75) Inventor: Jeremy F. Steele, Pawtucket, RI (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 416 days.

(21) Appl. No.: 11/133,885

(22) Filed: May 23, 2005

(65) Prior Publication Data
US 2006/0261795 A1 Nov. 23, 2006

(51) Int. Cl.
*G05F 1/40* (2006.01)
*G05F 1/56* (2006.01)

(52) U.S. Cl. .................. 323/288; 323/282

(58) Field of Classification Search .......... 323/222, 323/223, 225, 268, 271, 282–285, 288
See application file for complete search history.

(56) References Cited

U.S. PATENT DOCUMENTS

| 6,057,675 | A  | * | 5/2000 | Tateishi | 323/283 |
| 6,580,258 | B2 |   | 6/2003 | Wilcox et al. | |
| 6,597,221 | B2 |   | 7/2003 | Hall et al. | |
| 6,794,917 | B1 | * | 9/2004 | Barrow et al. | 327/227 |
| 6,897,640 | B2 | * | 5/2005 | Nebon et al. | 323/282 |
| 2006/0043951 | A1 | * | 3/2006 | Oswald et al. | 323/282 |

* cited by examiner

*Primary Examiner*—Matthew V Nguyen
(74) *Attorney, Agent, or Firm*—Rennie William Dover

(57) ABSTRACT

A regulator circuit and a method for compensating for sag in the output signal of the regulator circuit. A first comparator is coupled to an input of an oscillator, which oscillator outputs a clock signal and a ramp signal. In accordance with a feedback signal from the output of the regulator circuit, the clock and ramp signals of the oscillator are reset if the output signal sags to an undesirable level. The clock and ramp signals can be reset between active edges of the clock. The reset clock and ramp signals cause the regulator circuit to increase its output voltage to reduce the sag.

11 Claims, 2 Drawing Sheets

METHOD FOR REGULATING AN OUTPUT SIGNAL AND CIRCUIT THEREFOR

FIELD OF THE INVENTION

This invention relates, in general, to electronic circuits and, more particularly, to DC to DC converters.

BACKGROUND OF THE INVENTION

Switching power supplies are used in a variety of electronic products including computers, calculators, cell phones, cameras, Personal Digital Assistants (PDAs), video game controllers, etc. These types of supplies generate regulated voltages that are used to provide power for the integrated circuits contained in the electronic products. FIG. 1 illustrates a conventional switching power supply 10 that includes a switching regulator 12 having outputs coupled to the gates of switching transistors 14 and 16. A drain terminal of switching transistor 14 is coupled for receiving a source of operating potential $V_{DD}$ and a source terminal of switching transistor 14 is connected to a drain terminal of switching transistor 16. The common connection of the source and drain terminals of switching transistors 14 and 16 is connected to one terminal of an inductor 18. The other terminal of inductor 18 is coupled to an output 20 of switching power supply 10. Output 20 is coupled for receiving a source of operating potential $V_{SS}$ through a capacitor 22 and through a resistor divider network 24. Resistor divider network 24 comprises a resistor 26 having a terminal connected to output 20 and a terminal commonly connected to one terminal of a resistor 28 at a node 30. The other terminal of resistor 28 is coupled for receiving source of operating potential $V_{SS}$. Node 30 is connected to an input of controller 12 and provides a feedback signal for controlling switching transistors 14 and 16.

In operation, when the output voltage drops below a predetermined value, a feedback signal from node 30 causes switching regulator 12 to generate a control signal, which in turn causes switching transistor 14 to turn on and increase the output voltage, $V_O$, at output 20. In this configuration, the control signal is synchronous with the system clock signal. Because the control signal can last from zero seconds to a full clock period, it can begin and end within a single clock period. However, it cannot be restarted until the next clock signal. A drawback with this system is that if a transient electrical signal causes the output voltage to sag after the control signal has ended, the control signal will not compensate for the sag until the next clock signal. One way to compensate for transient electrical signals that appear in the output signal has been to include a hysteretic control circuit within the controller. Although this technique is capable of quickly compensating for transient electrical signals appearing in the output, it does so without using a clock signal. Thus, the switching frequency of the switching regulator is not constant, but varies with temperature, input voltage, and the components themselves. What's more, because the switching frequency is not constant, the hysteretic control circuitry introduces electromagnetic noise which interferes with the performance of the electronic products. This noise is referred to as Electro-Magnetic Interference (EMI).

Hence, a need exists for a switching regulator and a method for regulating its output voltage with a fast response time while operating at a constant switching frequency using a clock signal.

SUMMARY OF THE INVENTION

The present invention satisfies the foregoing need by providing a circuit and a method for regulating an output signal. In accordance with one embodiment, the present invention includes a method for regulating an output signal comprising resetting a ramp signal and a clock signal in response to a feedback signal being either more than or less than a first reference voltage, wherein resetting the ramp signal and the clock signal begins a new control signal.

In accordance with another embodiment, the present invention includes a method for regulating an output signal comprising resetting a ramp signal and a clock signal in response to a feedback signal rising above or falling below a reference signal.

In accordance with yet another embodiment, the present invention includes a method for regulating an output voltage that includes providing a clock signal having first and second active clock signal edges. A ramp signal is used to generate an output signal in response to a first active signal edge of the clock signal. First and second signals are compared and the ramp signal is reset during a time between the first and second active clock signal edges if the second signal has a lower value than the first signal.

In accordance with yet another embodiment, the present invention comprises a regulator circuit that includes a first comparator having first and second inputs and an output. The output of the first comparator is coupled to an oscillator. A first output of the oscillator is coupled to a first input of a second comparator and the output of the second comparator is coupled to a first input of a latch. A second output of the oscillator is coupled to a second input of the latch.

BRIEF DESCRIPTION OF THE DRAWINGS

The present invention will be better understood from a reading of the following detailed description, taken in conjunction with the accompanying drawing figures, in which like reference numbers designate like elements, and in which.

DETAILED DESCRIPTION

Figure 1:
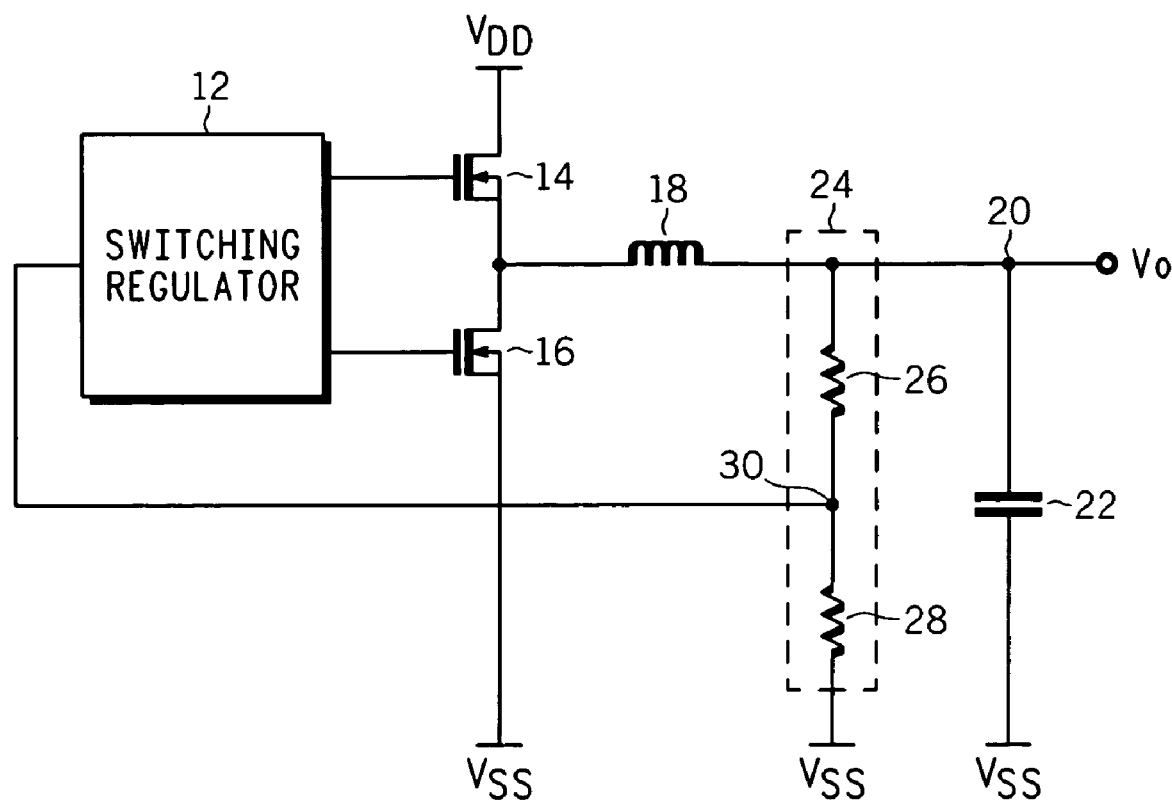
FIG. 1 is schematic diagram of a prior art switching power supply.
Figure 2:
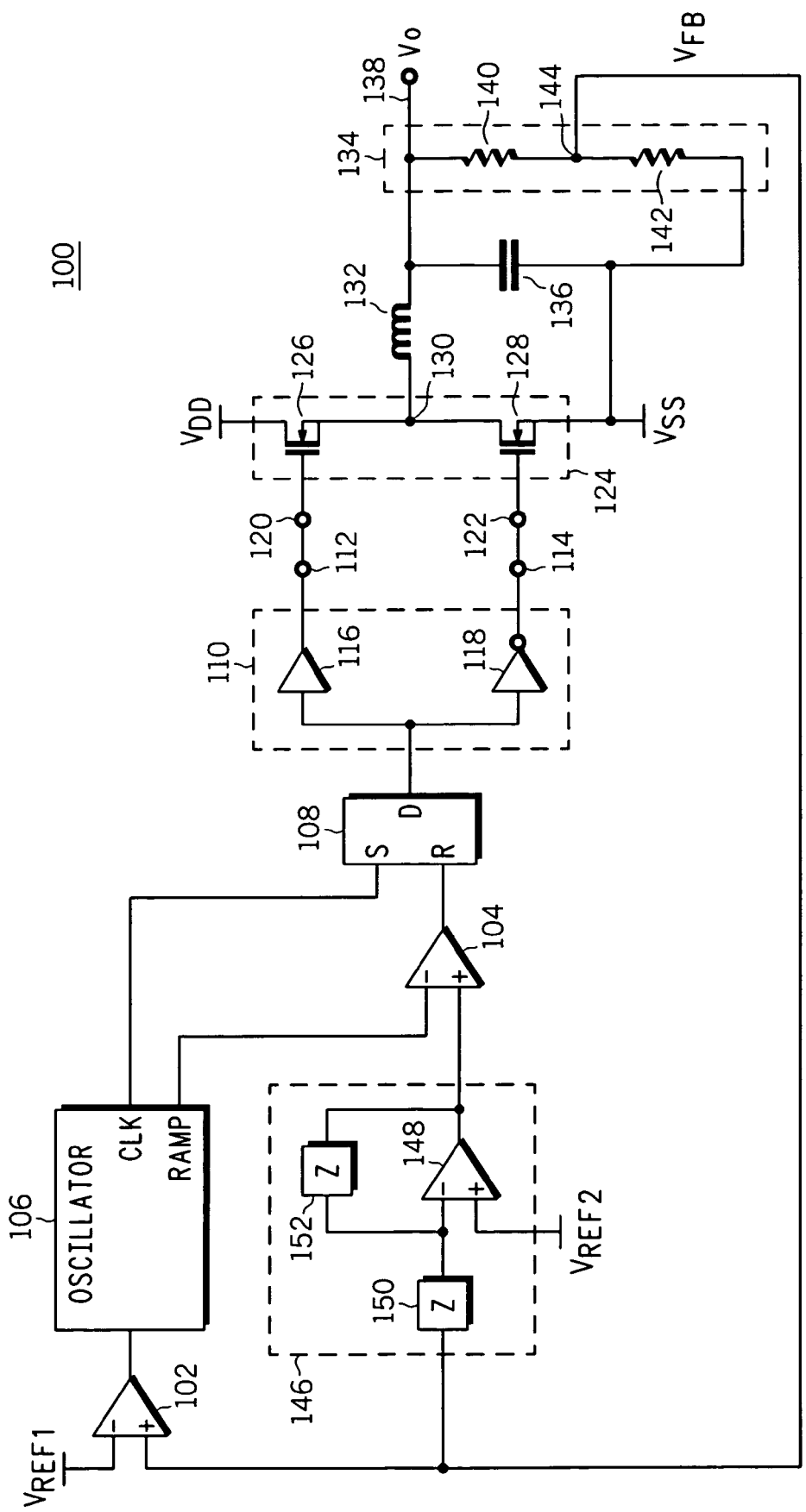
FIG. 2 is a schematic diagram of a switching regulator in accordance with an embodiment of the present invention.

FIG. 2 is a schematic diagram of a switching power supply 100 in accordance with an embodiment of the present invention. Switching power supply 100 comprises differential comparators 102 and 104, an oscillator 106, a latch 108, a gate drive circuit 110, a switching network 124, a voltage divider network 134, and an error amplifier 146. More particularly, differential comparator 102 has a non-inverting input coupled for receiving a feedback voltage signal $V_{FB}$ from voltage divider network 134 and an inverting input coupled for receiving a reference voltage $V_{REF1}$. The output of differential comparator 102 is coupled to an input of oscillator 106, which oscillator 106 has an output for transmitting a clock signal CLK and an output for transmitting a periodic signal RAMP. It should be noted that the periodic signal is designated RAMP because it is preferably a ramp signal. However, the periodic signal is not limited to being a ramp signal.

The output of oscillator 106 for transmitting periodic signal RAMP is coupled to an inverting input of differential comparator 104. The non-inverting input of differential comparator 104 is coupled to the output of error amplifier 146. The output of differential comparator 104 is coupled to an input R of latch 108. The output of oscillator 106 for transmitting the clock signal CLK is coupled to an input S of latch 108.

The output of latch 108 is coupled to a gate drive circuit 110 having a high-side drive output 112 and a low-side drive output 114. By way of example, gate drive circuit 110 comprises a non-inverter driver 116 and an inverter driver 118 having commonly connected inputs that are coupled to the output of latch 108, which output is identified by the letter D. The outputs of drivers 116 and 118 are coupled to high-side drive output 112 and low-side drive output 114 of gate drive circuit 110, respectively.

High-side drive output 112 is connected to an input 120 of switching network 124 and low-side drive output 114 is connected to an input 122 of switching network 124. By way of example, switching network 124 comprises N-channel transistors 126 and 128. The drain terminal of N-channel transistor 126 is coupled for receiving a source of operating potential $V_{DD}$, the source terminal of N-channel transistor 126 is connected to the drain terminal of N-channel transistor 128, and the gate of N-channel transistor 126 is coupled to input 120 of switching network 124. The source terminal of N-channel transistor 128 is coupled for receiving a source of operating potential $V_{SS}$ and the gate terminal of N-channel transistor 128 is coupled to input 122 of switching network 124. By way of example, source of operating potential $V_{DD}$ ranges from about 5 volts to about 12 volts and source of operating potential $V_{SS}$ is about zero volts, i.e., ground. The commonly connected source and drain terminals of transistors 126 and 128 form a node 130.

One terminal of an inductor 132 is connected to node 130 and the other terminal is connected to voltage divider network 134 and to one terminal of a capacitor 136 to form an output node 138. The other terminal of capacitor 136 is coupled for receiving source of operating potential $V_{SS}$. In accordance with one embodiment, voltage divider network 134 comprises a pair of resistors 140 and 142 wherein one terminal of resistor 140 is connected to output node 138 and the other terminal is connected to a terminal of resistor 142 to form a feedback node 144. The other terminal of resistor 142 is coupled for receiving source of operating potential $V_{SS}$.

Feedback node 144 is connected to error amplifier 146 and to the non-inverting input of differential comparator 102. Error amplifier 146 comprises an operational amplifier 148 having a non-inverting input coupled for receiving a reference signal $V_{REF2}$ and an inverting input coupled in a negative feedback configuration to feedback node 144. More particularly, feedback node 144 is coupled to the inverting input terminal of operational amplifier 148 through an impedance 150 and the output of operational amplifier 148 is coupled to the inverting input of operational amplifier 148 though an impedance 152. The output of operational amplifier 148 is connected to the output of error amplifier 146, which is connected to the non-inverting input of differential comparator 104. Impedances 150 and 152 serve as a frequency-compensation/gain-control network that assists in providing stability to the control loop of controller 100 and are further identified by the letter "Z." In an alternative embodiment, impedance 150 can be incorporated into feedback network 134. An example of the alternative embodiment is a capacitor (not shown) connected in parallel with resistor 140, i.e., one terminal of a capacitor is connected to node 38 and the other terminal is connected to node 144.

Preferably, reference voltage $V_{REF1}$ is a lower voltage than reference voltage $V_{REF2}$. Voltages $V_{REF1}$ and $V_{REF2}$ can be reference voltages generated internally by the integrated circuit containing switching power supply 100 or they can be set or adjusted from a source external to the integrated circuit.

In operation, a load (not shown) is coupled between output node 138 and source of operating potential $V_{SS}$ and an output voltage $V_O$ is developed across the load, i.e., at output node 138. Switching power supply 100 is designed so that output voltage $V_O$ is preferably maintained within a predefined set of limits. Under normal operating conditions, oscillator 106 generates a clock signal CLK and a periodic signal RAMP. Suitable signals for the CLK and RAMP signals include voltage signals, current signals, or the like. Clock signal CLK has a plurality of active pulse edges that generate a square wave at node 130 which produces output voltage $V_O$ at node 138. The presence of output voltage $V_O$ at output node 138 generates a voltage across voltage divider network 134 such that feedback signal $V_{FB}$ appears at feedback node 144. The value of feedback signal $V_{FB}$ is given by equation 1 (EQT. 1):

$$V_{FB}=R_{142}/(R_{140}+R_{142})*V_O \tag{EQT. 1}$$

where:
  $R_{140}$ is the resistance of resistor 140;
  $R_{142}$ is the resistance of resistor 142; and
  $V_O$ is the output voltage at output node 138.

When output voltage $V_O$ droops or sags, i.e., decreases, feedback voltage $V_{FB}$ also decreases. Feedback voltage $V_{FB}$ appears at an input of error amplifier 146 and at the non-inverting input of comparator 102. Feedback voltage $V_{FB}$ is amplified by error amplifier 146 to generate an amplified error signal which is transmitted to the non-inverting input of differential comparator 104. At differential comparator 102, feedback voltage $V_{FB}$ is compared to reference voltage $V_{REF1}$ to create a comparison signal at the input of oscillator 106. When the value of voltage $V_{FB}$ is less than the value of voltage $V_{REF1}$, the comparison signal appearing at the input of oscillator 106 causes oscillator 106 to reset periodic and clock signals RAMP and CLK, respectively. Periodic signal RAMP is transmitted to the inverting input of comparator 104 and clock signal CLK is transmitted to input S of latch 108. When periodic signal RAMP exceeds the amplified error signal appearing at the non-inverting input of differential comparator 104, a logical high voltage signal appears at the output of differential comparator 104 which is transmitted to input R of latch 108. The signal appearing at the output of differential comparator 104 is also referred to as a comparison signal. When the comparison signal is a logical high voltage, it serves as a reset signal to end the on-time of transistor 126. The start of the on-time of transistor 126 is determined by clock signal CLK going to input S of latch 108. A positive going edge at input S on latch 108 produces a logical high voltage on output D of latch 108, i.e., it produces a latch signal. The logical high voltage is transmitted to high-side drive output 112 through non-inverter driver 116 and turns on N-channel transistor 126. The signal appearing at the input of gate drive circuit 110 is referred to as a pre-control signal whereas the signal appearing at output 112 and input 120 is referred to as a control signal or a new control signal when it replaces a previous control signal. Thus, the latch signal generates the pre-control signal in accordance with a new clock signal. The logical high voltage appearing at the input of driver circuit 110 is converted to a logical low voltage by inverter 118, which logical low voltage appears at low-drive output 114 and turns off N-channel transistor 128. Because N-channel transistor 128 is off or non-conductive, the current flowing through N-channel transistor 126 flows through capacitor 136 to increase the output voltage $V_O$ appearing at output node 138. Thus, in response to feedback signal $V_{FB}$ being less than reference voltage $V_{REF1}$, periodic signal RAMP and clock signal CLK are reset between two successive active pulse edges of the clock signal CLK. Preferably, the active pulse edges are rising edges; however, they can be falling edges. This signal is clocked into latch 108 to generate a regulated output signal. It should be understood that the relative values of feedback signal $V_{FB}$, $V_{REF1}$, and $V_{REF2}$ are not limitations of the present invention. Switching power supply 100 can be configured such that signals RAMP and CLK are reset in response to feedback voltage $V_{FB}$ being greater than reference voltage $V_{REF1}$.

By now it should be appreciated that a switching regulator and a method for resetting a ramp signal and a clock signal from an oscillator have been provided. An advantage of the present invention is that the ramp signal can be reset, the clock signal can be reset, or both the ramp and clock signals can be reset. Another advantage is that these signals can be reset within a current clock period or cycle, thereby providing fast and efficient compensation for any transients that may cause the output signal to sag. They can also be reset after the end of a previous control signal, but before the beginning of a subsequent clock signal. The present invention also provides a cost efficient technique of compensating for transients that may appear in the output voltage. Another advantage is that the switching regulator can be manufactured using monolithic integrated circuit manufacturing processes or using discrete components.

Although certain preferred embodiments and methods have been disclosed herein, it will be apparent from the foregoing disclosure to those skilled in the art that variations and modifications of such embodiments and methods may be made without departing from the spirit and scope of the invention. For example, the output signal can be a current signal, a voltage, signal, or the like. It is intended that the invention shall be limited only to the extent required by the appended claims and the rules and principles of applicable law.

What is claimed is:

1. A method for regulating an output signal, comprising:
resetting a ramp signal and a clock signal in response to a feedback signal being one of greater than or less than a first reference voltage, wherein resetting the ramp signal and the clock signal:
occurs before the previous control signal ends within a current clock cycle;
begins a new control signal and includes:
generating the feedback signal in response to an output signal;
comparing the feedback signal to the first reference voltage to generate a comparison signal;
resetting the clock signal and the ramp signal in accordance with the comparison signal; and further including:
comparing the feedback signal to a second reference voltage to generate an error signal;
comparing the new ramp signal and the error signal to generate a second comparison signal; and
latching the second comparison signal in accordance with the new clock signal to generate a pre-control signal.

2. The method of claim 1, further including generating the pre-control signal from the latch signal.

3. The method of claim 2, further including using the new control signal to boost the output voltage.

4. The method of claim 2, wherein the output signal is one of a current signal or a voltage signal.

5. The method of claim 1, wherein resetting the ramp signal and the clock signal comprises resetting the ramp signal and the clock signal in response to the feedback signal being greater than the first reference voltage.

6. The method of claim 1, wherein resetting the ramp signal and the clock signal comprises resetting the ramp signal and the clock signal in response to the feedback signal being less than the first reference voltage.

7. A regulator circuit, comprising:
a first comparator having first and second inputs and an output;
an oscillator having an input and a first output, the output of the first comparator coupled to the input of the oscillator;
a second comparator having first and second inputs and an output, the first output of the oscillator coupled to the first input of the second comparator; and
a latch having a first input and an output, the first input coupled to the output of the second comparator.

8. The regulator circuit of claim 7, wherein the oscillator has a second output and the latch has a second input, the second output of the oscillator coupled to the second input of the latch.

9. The regulator circuit of claim 7, further including an error amplifier having first and second inputs and an output, the first input of the error amplifier coupled for receiving a first reference signal, the second input of the error amplifier coupled for receiving a feedback signal, and the output of the error amplifier coupled to the second input of the comparator.

10. The regulator circuit of claim 7, wherein the first input of the first comparator is coupled for receiving a second reference signal and the second input of the first comparator is coupled for receiving the feedback signal.

11. The regulator circuit of claim 9, further including:
a drive circuit having an input and first and second outputs, the output of the latch coupled to the input of the drive circuit;
a first transistor having a control electrode and first and second current carrying electrodes, the first output of the drive circuit coupled to the control electrode of the first transistor and the second current carrying electrode coupled for receiving an input signal; and
a second transistor having a control electrode and first and second current carrying electrodes, the second output of the drive circuit coupled to the control electrode of the second transistor, the first current carrying electrode of the second transistor coupled to the second current carrying electrode of the first transistor, and the second current carrying electrode of the second transistor coupled for receiving a source of operating potential.

* * * * *